(12) United States Patent
Welker et al.

(10) Patent No.: US 10,995,293 B2
(45) Date of Patent: May 4, 2021

(54) SYSTEM AND METHOD FOR ODORIZING NATURAL GAS

(71) Applicant: Welker, Inc., Sugar Land, TX (US)

(72) Inventors: Kyle Welker, Sugar Land, TX (US); Wade Williams, Sugar Land, TX (US); Paul Minier, Fulshear, TX (US)

(73) Assignee: Welker, Inc., Sugar Land, TX (US)

( * ) Notice: Subject to any disclaimer, the term of this patent is extended or adjusted under 35 U.S.C. 154(b) by 44 days.

(21) Appl. No.: 16/294,134

(22) Filed: Mar. 6, 2019

(65) Prior Publication Data

US 2019/0203133 A1 Jul. 4, 2019

Related U.S. Application Data

(62) Division of application No. 15/486,831, filed on Apr. 13, 2017, now Pat. No. 10,344,237.

(51) Int. Cl.
*C10L 3/00* (2006.01)
*G05D 11/13* (2006.01)
(Continued)

(52) U.S. Cl.
CPC .............. *C10L 3/006* (2013.01); *F17D 3/12* (2013.01); *G05D 7/0641* (2013.01);
(Continued)

(58) Field of Classification Search
CPC ............ C10L 2230/10; C10L 2290/24; C10L 2290/58; C10L 2290/60; C10L 3/006;
(Continued)

(56) References Cited

U.S. PATENT DOCUMENTS 2,261,590 A ‡ 11/1941 Rutherford ................ C10J 1/00
 261/76
3,545,949 A ‡ 12/1970 Oister ........................ C10J 1/00
 252/68

(Continued)

OTHER PUBLICATIONS

Welker, Kyle. "Overview of Odorization Systems.", presented Aug. 2012, Appalachian Gas Measurement Short Course at Robert Morris University.‡

*Primary Examiner* — William M McCalister
(74) *Attorney, Agent, or Firm* — Husch Blackwell LLP (57) ABSTRACT

The present disclosure provides a system and method for odorizing natural gas flowing through a distribution pipeline. The system includes a bypass line adjacent to a distribution pipeline, wherein bypass gas flows through the bypass line and an odorant tank connected to the bypass line, and into the distribution pipeline; a high-flow control valve and a low-flow control valve in the bypass line, wherein bypass gas flows through the odorant tank into the distribution pipeline when the high-flow control valve or the low-flow control valve is open; and a programmable logic controller connected to the high-flow and low flow control valve; wherein the programmable logic controller opens the high-flow or low-flow control valve for a predetermined dwell time proportional to an amount of bypass gas needed to odorize gas in the distribution pipeline each time that a preselected quantity of gas flows through the distribution pipeline.

8 Claims, 5 Drawing Sheets

(51) Int. Cl.
*F17D 3/12* (2006.01)
*G05D 7/06* (2006.01)

(52) U.S. Cl.
CPC ......... *G05D 7/0652* (2013.01); *G05D 11/131* (2013.01); *C10L 2230/10* (2013.01); *C10L 2290/24* (2013.01); *C10L 2290/58* (2013.01); *C10L 2290/60* (2013.01); *Y10T 137/2501* (2015.04)

(58) Field of Classification Search
CPC ...... F17D 3/12; G05D 11/131; G05D 7/0641; Y10T 137/2501
USPC .......................................................... 137/89
See application file for complete search history.

(56) References Cited

U.S. PATENT DOCUMENTS

| | | | | |
|---|---|---|---|---|
| 3,669,637 A ‡ | 6/1972 | Klass et al. | ............ | B01D 61/00 137/3 |
| 4,007,755 A * | 2/1977 | Lerner | ................ | B01F 15/0412 137/101.21 |
| 4,100,800 A ‡ | 7/1978 | Pelt | ............ | G01F 7/00 137/51 |
| 4,354,516 A * | 10/1982 | Newell | ................ | B01F 5/0403 137/114 |
| 4,487,613 A * | 12/1984 | Yoshida | ................ | C10L 3/006 116/214 |
| 4,504,281 A * | 3/1985 | Williams, Jr. | ........... | C10L 3/006 137/806 |
| 5,076,705 A ‡ | 12/1991 | Brickhouse | ............ | B01F 5/0602 137/51 |
| 5,167,867 A * | 12/1992 | Quaife | ................ | C10L 3/006 252/408.1 |
| 5,291,780 A ‡ | 3/1994 | Thomas | ................ | G01F 1/32 73/195 |
| 5,406,970 A * | 4/1995 | Marshall | ............ | G05D 11/131 137/101.25 |
| 6,142,162 A * | 11/2000 | Arnold | ................ | G05D 11/133 137/101.19 |
| 6,895,813 B2 ‡ | 5/2005 | Mattar | ................ | G01F 1/3209 73/197 |
| 7,056,360 B2 ‡ | 6/2006 | Zeck | ................ | C10L 3/006 137/2 |
| 7,389,786 B2 ‡ | 6/2008 | Zeck | ................ | G05D 11/132 137/60 |
| 8,475,550 B2 ‡ | 7/2013 | Zeck | ................ | F17D 3/12 137/10 |
| 9,261,087 B2 * | 2/2016 | Kristola | ................ | F04B 43/107 |
| 2001/0014840 A1 ‡ | 8/2001 | Marshall | ............ | G05D 7/0676 700/266 |
| 2004/0083652 A1 ‡ | 5/2004 | Zeck | ................ | C10L 3/006 48/195 |
| 2005/0112020 A1 ‡ | 5/2005 | Zeck | ................ | G05D 11/132 422/4 |
| 2005/0155644 A1 ‡ | 7/2005 | Woollums | ................ | F17D 1/04 137/3 |
| 2007/0219113 A1 ‡ | 9/2007 | Patrick | ................ | C10L 3/006 512/4 |
| 2009/0242035 A1 ‡ | 10/2009 | Zeck | ................ | F17D 3/12 137/3 |
| 2009/0300987 A1 * | 12/2009 | Charles | ................ | C10L 3/006 48/127.3 |
| 2016/0115407 A1 ‡ | 4/2016 | Cagnon | ................ | B05B 15/58 137/1 |

\* cited by examiner
‡ imported from a related application

SYSTEM AND METHOD FOR ODORIZING NATURAL GAS

CROSS REFERENCE TO RELATED APPLICATIONS

This application is a divisional application of U.S. patent application Ser. No. 15/486,831 filed on Apr. 13, 2017 entitled SYSTEM AND METHOD FOR ODORIZING NATURAL GAS, the entire disclosure of which is hereby incorporated herein by reference in its entirety.

BACKGROUND

The present invention relates generally to odorization of natural gas, and more specifically to an improved system and method for adding odorant to natural gas flowing in a pipeline.

Natural gas is odorless. Because of its potentially dangerous nature, for many years federal regulations have required the addition of an odorant to natural gas so that it can be detected by smell. Odorants such as tertiary butyl mercaptan (TBM) and various blends of commonly accepted chemicals are used in the industry.

The odorants added to natural gas, which are provided in liquid form, are often added to the gas at the location where distribution gas is taken from a main gas pipeline and provided to a distribution pipeline. At this point, the gas pressure is stepped down through a regulator, typically from a pressure of approximately 600 psi or more to a lower pressure of approximately 100 psi or less. The odorants can also be added to gas in the main transmission pipeline.

Odorants used with natural gas are extremely concentrated, so that only a small amount of liquid is needed to odorize a relatively large volume of natural gas. For example, with odorants such as TBM and other blends, it is common to use approximately 0.75 lbs. of liquid odorant to odorize 1,000,000 standard cubic feet (SCF) of natural gas.

Odorants such as TBM and other blends are mildly corrosive, and very noxious. It is important that a correctly measured amount of odorant be added to natural gas; otherwise, various problems will result. For example, over-odorization results in excess odors within the valves, pipes, and other equipment used in natural gas distribution. In addition, too much odorant causes the distinctive odorant smell to be noticeable even after the natural gas is burned. This leads to consumer calls complaining of natural gas leaks, each of which must be responded to by the natural gas distribution company. The expense of such calls, when there is no leak involved, is quite high.

It is also important that the odorant levels not be too low. Safety considerations mandate that a natural gas leak be easily detectable by most people. The proper concentration of odorant within natural gas provides this safety measure, but under-odorization is dangerous because actual leaks may not be detected in time.

One technique in current use to provide odorization to natural gas in a main distribution pipeline involves bypassing a small amount of natural gas, at a slightly higher pressure than the low pressure distribution pipeline, through a tank containing liquid odorant. This bypass gas absorbs relatively high concentrations of the odorant while in the tank. When this heavily odorized bypass gas is placed back into the main pipeline, the odorant, now in gas form, diffuses throughout the pipeline.

Because the bypass gas picks up such large amounts of odorant from the liquid in the tank, becoming completely saturated with odorant gas, it is necessary that carefully monitored small amounts of bypass gas be used. The present approach is to divert the bypass gas through one solenoid valve controlled by a programmable logic controller (PLC). The PLC causes the solenoid valve to open and close for periods of time ranging from fractions of a second to several minutes, depending on the pressure of the bypass gas coming in and the desired pressure coming out. Ideally, the solenoid will close and open fairly often so that the flow of gas is relatively stable. For example, the solenoid valve may be open for 50% of every 10 second period. However, the single-solenoid valve system can be problematic when consumer demand for natural gas changes, such as during seasonal changes. During winter, demand for natural gas is much higher, whereas during summer, the demand is minimal. A single solenoid may have to remain open for very long stretches of time in one season (e.g., ≥90% during winter) and for very short periods of time in another season (e.g., ≤10% during summer), which results in an unstable flow of gas.

It would be desirable to provide an odorization technique, and equipment to be used therewith, which provides both a more reliable and flexible technique for odorizing natural gas. It would be desirable that the equipment be simple and reliable in operation, and that it be flexible enough to easily accommodate significant changes in the operating condition of the gas pipeline and changes in consumer demand for natural gas.

SUMMARY OF THE INVENTION

The present disclosure provides a system for odorizing natural gas flowing through a distribution pipeline. The system includes:

a bypass line adjacent to a distribution pipeline;

an odorant tank connected to the bypass line, wherein bypass gas flows through the bypass line, through the odorant tank, and into the distribution pipeline;

a high-flow control valve and a low-flow control valve in the bypass line, wherein bypass gas flows through the odorant tank and into the distribution pipeline only when (i) the high-flow control valve is open, (ii) the low-flow control valve is open, or (iii) both the high-flow control valve and the low-flow control valve are open;

a flow meter on the distribution pipeline that monitors gas flow through the distribution pipeline; and a programmable logic controller connected to the flow meter, the high-flow control valve and the low-flow control valve;

wherein the programmable logic controller opens (a) the high-flow control valve, (b) the low-flow control valve, or (c) both the high-flow control valve and the low-flow control valve, for a predetermined dwell time that is proportional to an amount of bypass gas needed to odorize gas in the distribution pipeline each time that a preselected quantity of gas flows through the distribution pipeline.

The present disclosure also provides a controller for a natural gas odorant system. The controller includes:

an input adapted to accept an input signal from a gas flow meter;

an output adapted to control a high-flow control valve and a low-flow control valve;

a memory storing a dwell time value, a target flow count value indicative of how often the high-flow control valve or the low-flow control valve should be opened with relation to gas flow, and a target opening duration value indicative of whether to open (a) the high-flow control valve, (b) the low-flow control valve, or (c) both the high-flow control valve and the low-flow control valve; and an output driver for sending a signal from the output to (a) the high-flow control valve, (b) the low-flow control valve, or (c) both the high-flow control valve and the low-flow control valve, for a time period equal to the stored dwell time, wherein the signal is sent from the output at times determined by the target flow count value and data received through the input, and the signal is sent to either the high-flow control valve or the low-flow control valve at times determined by the target opening duration value.

The present disclosure also provides a method for odorizing natural gas in a pipeline. The method includes the steps of:

providing liquid odorant in a tank;

measuring gas flow through the pipeline;

measuring a valve opening duration of a high-flow control valve in a bypass line and a low-flow control valve in the bypass line;

comparing the gas flow with a target flow count;

comparing the valve opening duration with a target valve opening duration;

opening the high-flow control valve when (i) the gas flow is equal to or greater than the target flow count and (ii) the valve opening duration is equal to or greater than the target valve opening duration, to allow a first known volume of gas, saturated with odorant, to flow from the odorant tank into the pipeline; wherein the high-flow control valve is opened for a dwell time proportional to the first known volume of saturated gas; and opening the low-flow control valve when (i) the gas flow is equal to or greater than the target flow count and (ii) the valve opening duration less than the target valve opening duration, to allow a second known volume of gas, saturated with odorant, to flow from the odorant tank into the pipeline; wherein the low-flow control valve is opened for a dwell time proportional to the second known volume of saturated gas.

DETAILED DESCRIPTION

As described below, the present disclosure provides a bypass odorization system in which small amounts of odorant saturated gas are added to a natural gas distribution or transmission pipeline. A known, pre-calculated volume of saturated gas is added for a known volume of gas flowing through the main pipeline. The known volume of gas is obtained by opening one of at least two control valves in the bypass line for a pre-determined time period, referred to herein as the "dwell time" of a control valve. Because the valve characteristics and pressure drop across the valves are known, the volume of gas that flows through the valves during the dwell time can be accurately pre-calculated. Each cycle of opening and closing one control valve is referred to as a "pulse."

Figure 1:
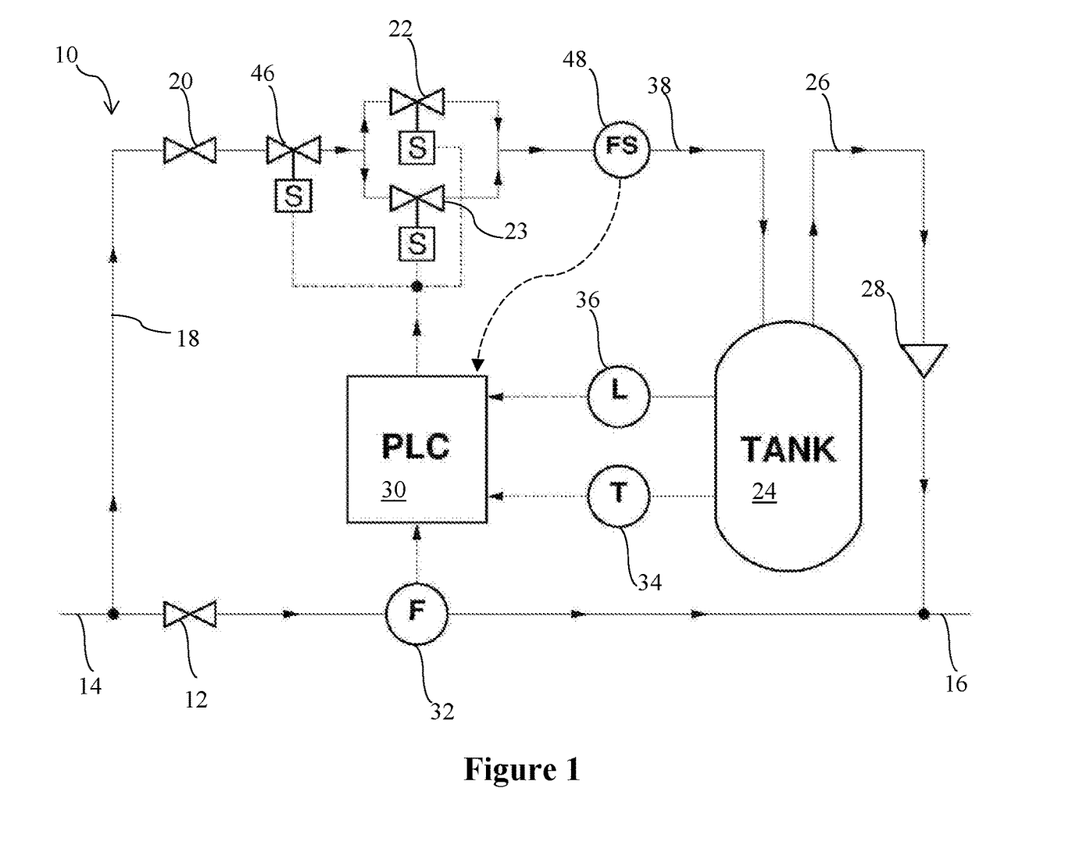
FIG. 1 is a schematic diagram of a natural gas odorization system constructed in accordance with an embodiment of the present disclosure.

Referring to FIG. 1, a gas odorization system 10 is shown schematically. A pressure regulator 12 is used to connect a main pipeline (also referred to as a "high pressure pipeline" or a "main gas line") 14 with a distribution pipeline 16 (or a transmission pipeline). Gas pressure in the main pipeline 14 can be, for example, 600-800 psi, while gas pressure in the distribution pipeline 16 is lower. A typical pressure in distribution pipeline 16 is 100 psi.

A tap 18 off the high pressure pipeline 14 is connected to a bypass regulator 20, which in turn allows bypass gas to flow to a low-flow control valve 22 and a high-flow control valve 23. In an embodiment, the bypass regulator 20 is a differential regulator that always provides gas at a pressure differential of 12-40 lbs. above that in the distribution pipeline 16, regardless of any variations that may occur in the gas pressure in the main pipeline 14. A pressure differential of 12-40 psi may be chosen, but it is desirable that the gas supplied to the low-flow control valve 22 and the high-flow control valve 23 be fixed at a known value above the gas pressure in distribution pipeline 16. A differential regulator may be used to maintain a constant pressure above that in the distribution pipeline 16.

Other techniques can be used to provide the pressure differential for the bypass gas line. For example, a compressor can be used to raise the pressure in the bypass line above that in the distribution line 16. It is still desirable to provide a differential regulator so that the bypass line pressure remains a constant value above that in the distribution line 16. This maintains the accuracy of gas flow through the low-flow control valve 22 and the high-flow control valve 23, as is explained in more detail below. Any technique that maintains pressure into the bypass line at a constant, known differential above the pressure in distribution line 16 can be used in this system and is contemplated by the present disclosure.

The "low-flow control valve" and the "high-flow control valve" are individual control valves with different gas flow rates. The low-flow control valve 22 has a lower flow rate relative to the flow rate of the high-flow control valve. Thus, the high-flow control valve 23 allows a relatively large amount of gas to pass through the bypass line 38 to satisfy increased consumer demand for gas, such as during winter, while the low-flow control valve 22 allows a relatively small amount of gas to pass through the bypass line 38 to satisfy decreased consumer demand for gas, such as during summer. In each case, the percentage of time that the low-flow control valve 22 or the high-flow control valve 23 is open during operation of the gas odorization system 10 may remain the same, or substantially the same, which advantageously allows for a flow of gas that is stable, or substantially stable. In an embodiment, the low-flow control valve 22 and the high-flow control valve 23 each is an electrically actuated solenoid valve.

In an embodiment, the low-flow control valve 22 has a flow rate from 100 cubic inches per second ($in^3$/sec), or 200 $in^3$/sec, or 300 $in^3$/sec to 400 $in^3$/sec, or 500 $in^3$/sec. In an embodiment, the high-flow control valve 23 has a flow rate from greater than 500 $in^3$/sec, or 550 $in^3$/sec, or 600 $in^3$/sec, or 700 $in^3$/sec to 800 $in^3$/sec, or 900 $in^3$/sec, or 1000 $in^3$/sec, or 1500 $in^3$/sec. Because the bypass regulator 20 regulates gas pressure in the bypass line 38 to be a known differential higher than the pressure in the distribution line 16, preferably 12-40 psi higher, the flow rate of gas through the low-flow control valve 22 and the high-flow control valve 23 can be easily calculated from the properties of each valve. Valve manufacturers typically provide tables, equations, or other data from which the flow rate of gas through the low-flow control valve 22 and the high-flow control valve 23 can be determined.

In an embodiment, the bypass line 38 is split (for example, with a Y connector) downstream of the bypass regulator 20 such that gas may flow to the low-flow control valve 22 or the high-flow control valve 23, and the split bypass line 38 is combined downstream of the low-flow control valve 22 and the high-flow control valve 23 (for example, with a Y connector).

While the present disclosure describes a gas odorization system 10 with two control valves (the low-flow control valve 22 and the high-flow control valve 23), it is understood that the gas odorization system may include more than two control valves, or from 2, or 3 to 4, or 5 control valves, wherein each control valve has a different flow rate. The gas odorization system includes at least two control valves. In an embodiment, the gas odorization system includes more than two control valves, wherein each control valve has a different flow rate. In another embodiment, the gas odorization system includes from 2 to 3, or 4, or 5, or 6, or 7, or 8, or 9, or 10 or more control valves, wherein each control valve has a different flow rate.

Odorant is stored in a tank 24 in liquid form. Any odorant used for odorizing natural gas, such as tertiary butyl mercaptan (TBM), may be used. An outlet line 26 passes from the tank 24 through a check valve 28 and back into distribution pipeline 16.

When the odorant tank 24 is filled with liquid odorant, space is left for gas above the surface of the odorant. In operation, this space is filled with natural gas that has entered the tank 24 through the low-flow control valve 22 or the high-flow control valve 23. Because of the high volatility of the liquid odorant, gas contained in the tank 24 above the surface of the liquid odorant is saturated with odorant in gaseous form.

A programmable logic controller (PLC) 30 is used to control operation of the gas odorization system 10. The PLC 30 has inputs connected to a flow meter 32 in the distribution pipeline 16, a temperature sensor 34 within the odorant tank 24, and an optional level sensor 36 within the odorant tank 24. As described below, the temperature sensor 34 compensates for temperature fluctuations within the odorant liquid. The flow meter 32 generates a signal proportional to the flow of gas within the distribution pipeline 16. Preferably, the flow meter 32 provides a digital pulse, or an analog signal, each time a known quantity of gas flows through the distribution pipeline 16. By counting the pulses provided by the flow meter 32, or by calculating flow from the analog signal provided by an analog meter, the PLC 30 can determine when a known, pre-selected volume of gas has flowed through the distribution pipeline 16.

The temperature sensor 34 measures the temperature of liquid odorant within the tank 24. In a typical installation, the tank 24 is located above ground, and temperature variations in accordance with weather and time of day are common. Liquid odorant contained in the tank 24 expands as its temperature increases, and contracts as its temperature decreases. Compensation for this volumetric change provides proper odorization of the gas in the distribution pipeline 16, as described below in more detail.

The level sensor 36 detects the level of liquid odorant remaining in the tank 24. This data is useful to an operator of the odorizer, particularly when the odorizer is monitored remotely, as described below, in order for liquid odorant to be replenished when its level becomes low, and so that proper odorant use may be verified.

The PLC 30 also provides an output signal that controls the low-flow control valve 22 and the high-flow control valve 23. In an embodiment, the low-flow control valve 22 and the high-flow control valve 23 each is an electrically actuated solenoid valve, but can alternatively be any valve that may be controlled by a suitable signal from the PLC 30.

Once the flow rate for the low-flow control valve 22 and the high-flow control valve 23 is determined (as described above), in advance, the low-flow control valve 22 and the high-flow control valve 23 need merely be held open for a calculated interval, referred to herein as the "dwell time," in order to allow a known volume of gas to pass through the bypass line 38 and into the odorant tank 24. The gas flowing into the tank 24 will cause an equal volume of saturated gas to flow through the outlet line 26, and the check valve 28, into the distribution line 16. By simply adjusting the dwell time for the low-flow control valve 22 and the high-flow control valve 23, the volume of bypass gas injected into the main pipeline 16 can be easily controlled.

The PLC 30 itself may be any suitable programmable logic controller available in the industry, and may be, for example, a DL250CPU controller available from PLC Direct.

As described in connection with FIG. 1, the PLC 30 has inputs connected to the flow meter 32, the temperature sensor 34, and the optional level sensor 36. The PLC 30 provides a control signal output to the low-flow control valve 22 and the high-flow control valve 23, each of which is preferably an electrically actuated solenoid valve. In addition to these primary connections, other inputs and outputs are provided for the PLC 30.

A power supply provides power for the PLC 30. The power supply may be any suitable supply as known in the art. A backup battery is preferably provided to keep the PLC 30 powered in case of a failure in the power supply. In addition, a solar supply may be used to provide charge to the backup battery. In suitable conditions, the power supply can be dispensed with and all power for the PLC 30 provided from the solar supply through the battery, which is especially advantageous for installation in remote locations where normal power may not be available.

For safety considerations, a master shutdown valve 46 is optionally provided in the bypass line 38 along with the low-flow control valve 22 and the high-flow control valve 23. The shutdown valve 46 operates in conjunction with the flow sensor 48, and is used only in the case of a failure elsewhere. The shutdown valve 46 is maintained in a normally opened position during odorizer operation. When either the low-flow control valve 22 or the high-flow control valve 23 is opened (or optionally, both the low-flow control valve 22 and the high-flow control valve 23 are open), the flow sensor 48 should sense a flow of gas through the bypass line 38. It is not necessary to measure the volume of gas flowing through the bypass line 38, but simply to sense its presence. If the PLC 30 determines that no gas is sensed by the flow sensor 48 while either the low-flow control valve 22 or the high-flow control valve 23 is opened, the master shutdown valve 46 is closed to stop all bypass gas flow. Such a situation could occur with a failure of the low-flow control valve 22 and/or the high-flow control valve 23, and closing the shutdown valve 46 prevents the escape of natural gas out of the system. If either the low-flow control valve 22 or the high-flow control valve 23 fails in an open position, the flow sensor 48 will be continuously activated. Because this condition would cause extreme over-odorization of the gas in the distribution pipeline 16, the shutdown valve 46 can be used to interrupt gas flow through the bypass line 38. In this case, if desirable, the PLC 30 can be programmed to toggle the shutdown valve 46 in response to gas flowing through the bypass line 38—in effect using shutdown valve 46 as a backup control valve. In an embodiment, the shutdown valve 46 is an electrically actuated solenoid valve, but can alternatively be any valve that may be controlled by a suitable signal from the PLC 30.

In an embodiment, the PLC 30 also provides one or more alarm outputs. These alarm outputs can be used to activate different types of alarms as appropriate and as known in the art. For example, a visible and/or audible alarm can be provided at the odorizer location. In addition, a signal may be sent to a remote site, via direct connection, radio or telephone line, to indicate to an operator that a failure has occurred and that immediate action is required. Different types of alarms, both informative and emergency, may be provided as desired by the PLC 30. The provision of alarms of different types is well known in the art, and will not be discussed in detail herein.

In an embodiment, the PLC 30 monitors the signal from the flow meter 32 to ensure that a signal is being received. If the PLC 30 loses the signal from the flow meter 32, whether such signal is digital pulses or an analog signal, the PLC 30 assumes that the flow meter 32 is not operating. At this point, any of three options can be performed, with the desired option being programmed into the PLC 30 ahead of time by an operator. The first option is to shut down the odorizer by closing each of the low-flow control valve 22, the high-flow control valve 23 and the shutoff valve 46, and generate the appropriate alarm. The second option is to enter a backup mode in which either the low-flow control valve 22 or the high-flow control valve 23 is operated at a constant rate that is programmed in advance, while activating the appropriate alarms. The third option is similar to the second, except that the average gas flow rate over a previous interval of time, for example one or two hours, is assumed to remain constant. The low-flow control valve 22 or the high-flow control valve 23 is then operated at a constant rate appropriate for that flow. As before, an appropriate alarm is generated.

The PLC 30 is also provided with at least one, preferably two, input/output data connections. A keypad, and an integral associated display, is physically located within the gas odorization system 10 for local access to the system by an operator. The PLC 30 can be reprogrammed through the keypad, and its status reviewed on the associated display.

In an embodiment, a computer is connected to the PLC 30 through a second input/output connection. This connection can be a direct serial link as known in the art, or may be made over a telecommunications line through modems (associated with the PLC 30 and/or associated with a remote computer). Through the use of modems connected over a phone line, the computer can be located anywhere. Use of a computer provides for greater ease in programming the PLC 30 and in collecting data generated by and stored within the PLC 30. Preferred methods for utilizing a remote computer in conjunction the PLC 30 will be described in more detail below. When a direct serial link is available, the computer can be, for example, a laptop computer carried to the odorization site.

Figure 2:
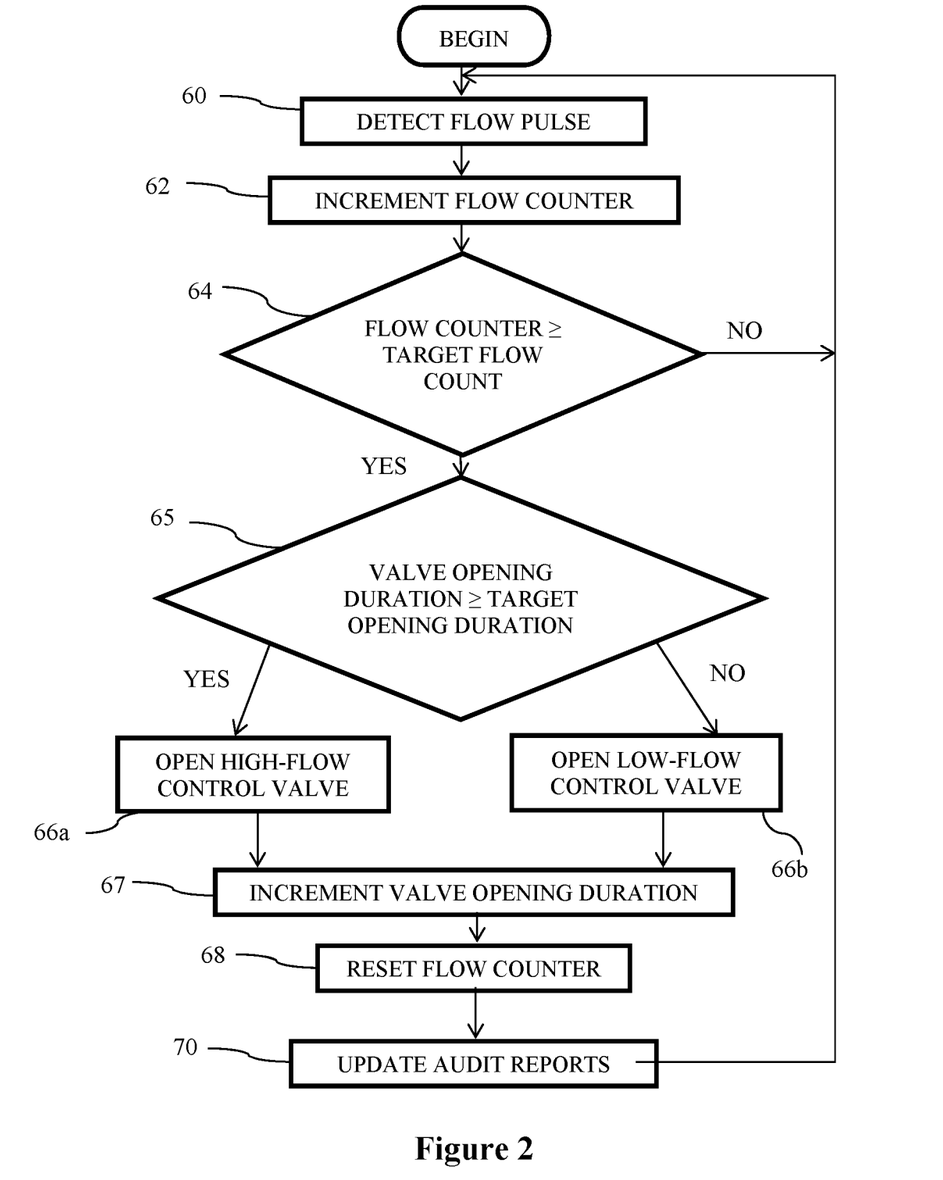
FIG. 2 is a flowchart illustrating normal operation of a natural gas odorization system in accordance with an embodiment of the present disclosure.

Most of the time, the gas odorization system 10 will be functioning in its normal operating mode. FIG. 2 is a flowchart describing the normal operating mode for PLC 30.

As gas flows through the distribution pipeline 16, a signal proportional to gas flow is generated by the flow meter 32. This signal is preferably digital pulses, or an analog signal that is converted to pulses for easy counting by the PLC 30. These pulses are detected 60 within the PLC, and for each pulse detected, a flow counter is incremented 62. The value stored within the counter is compared with a target flow count 64.

The target flow count is a value selected in advance as a function of both the properties of the flow meter 32, and the desired volume of gas flow through the distribution pipeline 16 that is desired to trigger a cycle of the gas odorization system 10. For example, if the flow meter 32 generates a pulse for every 10 standard cubic feet (SCF) of gas flow, and a cycle of odorizer is desired for every 200 SCF, the target flow count can be set to 20. If the flow counter value is less than the target flow count, the PLC returns to step 60 to await another flow pulse.

Once the counter reaches the target count in step 64, a valve opening duration, as described below, is compared with a target valve opening duration 65.

The target valve opening duration is a value selected in advance as a function of the desired continuity of the gas flow through the distribution pipeline 16. Ideally, either the low-flow control valve 22 or the high-flow control valve 23 will close and open fairly often so that the flow of gas is relatively stable (i.e., relatively continuous). In an embodiment, the target valve opening duration is 50%—indicating that either the low-flow control valve 22 or the high-flow control valve 23 is in an open position for 5 seconds of every 10 second period.

If the valve opening duration is equal to or greater than ($\geq$) the target valve opening duration, the high-flow control valve 23 is opened for the pre-calculated dwell time (step 66a), the valve opening duration is incremented 67, and the flow pulse counter is reset 68. In an embodiment, when the valve opening duration is greater than ($>$) the target valve opening duration, the high-flow control valve 23 and the low-flow control valve are both opened for the pre-calculated dwell time.

If the valve opening duration is less than ($<$) the target valve opening duration, the low-flow control valve 22 is opened for the pre-calculated dwell time (step 66b), the valve opening duration is incremented 67, and the flow pulse counter is reset 68. In an embodiment, if the valve opening duration is less than ($>$) the target valve opening duration, the low-flow control valve 22 is opened, and the high-flow control valve 23 is not opened.

The valve opening duration is incremented 67 such that the combined duration of time that the low-flow control valve 22 and the high-flow control valve 23 are open is provided as a percentage of time. In an embodiment, the control valve opening duration is incremented 67 in 10 second periods such that the control valve opening duration incremented 67 is the percentage of time within the 10 second period immediately prior to the moment valve opening duration is incremented that the low-flow control valve 22 and the high-flow control valve 23 are open.

In an embodiment, the odorizer 10 maintains information indicating its operational history. This information is advantageous for various reasons, including for oversight of the operation of the equipment, and for historical purposes in case of an accident. Audit information that is saved typically includes data showing the volume of odorant placed into the distribution pipeline 16, and similar information such as gas flow through the distribution pipeline 16 and the level of odorant remaining in the tank 24. This information is typically updated in step 70, and stored within the memory of the PLC 30. After the audit report information is updated 70, control returns back to step 60 to await the next pulse from the flow meter 32.

Figure 3:
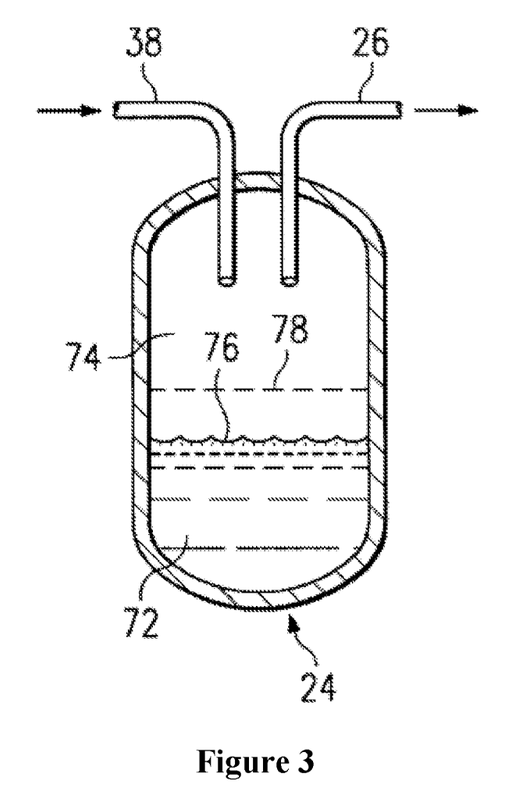
FIG. 3 is a diagram of the odorant tank of the natural gas odorization system of FIG. 1.

In an embodiment, the present bypass technique provides compensation for changes in temperature of the liquid odorant. FIG. 3 illustrates the benefits of such temperature compensation.

As shown in FIG. 3, bypass gas flows into the odorant tank 24 through the bypass line 38, and flows out of the odorant tank 24 to the gas distribution pipeline 16 through the outlet line 26. The tank 24 contains a quantity of liquid odorant 72, leaving a space 74 above an upper surface level 76 of the odorant 72 (when the temperature of the odorant 72 is constant, the upper surface level 76 does not change). Thus, when a given volume of gas flows into the tank 24 through the bypass line 38, an equal volume flows out of the tank 24 through the outlet line 26 (less the amount of odorant displaced).

The liquids used as odorants for natural gas are relatively sensitive to temperature changes. When the temperature of the liquid increases, so does its volume. When the temperature decreases, its volume decreases likewise. This change in volume with temperature is advantageously compensated by the PLC 30.

Referring to FIG. 3, assume that upper surface level 76 represents the upper surface level 76 of liquid odorant 72 at a given temperature. If the temperature of the liquid odorant 72 increases, such as can happen when direct sunlight shines on the odorant tank 24, its volume expands. After the expansion, the upper surface level of the odorant is at level location 78. Because the odorant 72 has expanded to fill the volume between surface levels 76 and 78, gas equivalent to this volume is forced out of the tank 24. Because of the setup of the gas odorization system 10, as illustrated in FIG. 1, this excess gas, which is saturated with odorant in the gas phase, will flow through the outlet line 26 and into the distribution pipeline 16.

Thus, as a result of liquid odorant 72 expansion, additional odorized bypass gas has been placed into the distribution pipeline 16. Unless compensated for, this will cause over-odorization of the gas in the distribution pipeline 16. In an embodiment, the odorizer 10, and further the PLC 30, compensates for such a temperature increase by skipping one or more odorizing pulse cycles normally caused by gas flow through the distribution line 16.

In a similar manner, if the initial level of the odorant is as indicated by upper surface level 78, and the liquid odorant 72 cools, its volume will diminish. Cooling can be caused by, for example, night or cloudy weather causing an ambient temperature change. As the upper surface of the odorant 72 falls from level 78 to level 76, the volume change must be made up by additional gas in the space 74.

Because of the check valve 28 on the outlet line 26, gas cannot flow back into the tank 24 through the outlet line 26. In addition, because of the valves on the bypass line 38, additional gas cannot flow into the tank 24 through the bypass line 38. Thus, the pressure in the tank 24 will decrease slightly when the volume of the liquid odorant 72 decreases. This slight decrease in pressure will eventually be made up by gas flowing into the tank 24 through the bypass line 38 when either the low-flow control valve 22 or the high-flow control valve 23 is opened, but may take one more pulses of either the low-flow control valve 22 or the high-flow control valve 23 to raise the gas pressure within the tank 24 and again enable gas to flow out through the outlet line 26.

In an embodiment, this loss of volume due to a lowering of the upper surface level 76 of liquid odorant 72 is compensated for by executing one or more additional pulses of the low-flow control valve 22 or the high-flow control valve 23. This will supply extra gas into the space 74 to make up for the loss in volume caused by the cooling of the odorant 72. Consequently, the PLC 30 compensates for changes in odorant temperature by modifying the dwell time of the high-flow control valve 23 and the low-flow control valve 22.

Regardless of the temperature of the liquid odorant 72, so long as the temperature remains constant, the volume will remain constant, except for the very small decreases caused when new gas enters the tank 24 and absorbs odorant. Thus, compensation by way of extra pulses, or eliminating pulses, need only be performed when the temperature changes.

Figure 4:
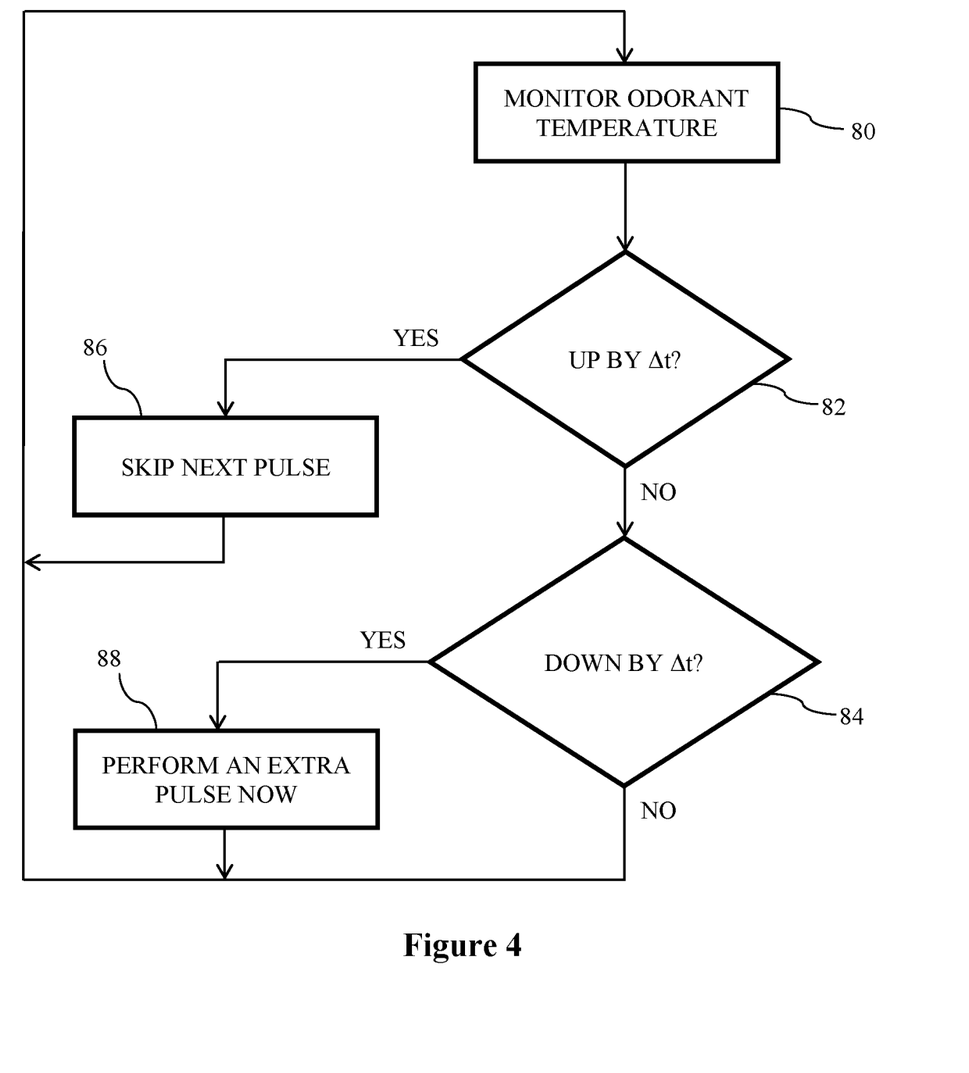
FIG. 4 is a flowchart illustrating operation of the programmable logic controller in performing temperature compensation in accordance with an embodiment of the present disclosure.

FIG. 4 is a flowchart illustrating operation of the PLC 30 to compensate for temperature changes in the liquid odorant 72. As shown in step 80, the liquid odorant 72 temperature is constantly monitored. A check is made to see if the temperature of the liquid odorant 72 has increased by a sufficient temperature 82. If not, a check is made to see if the liquid odorant 72 temperature has decreased by a sufficient change in temperature 84. If not, the PLC returns to its monitor cycle 80.

If the temperature of the liquid odorant 72 has gone up by a sufficient amount (step 82), additional odorant has been injected into the distribution pipeline 16 by the volume increase of the liquid odorant 72. Therefore, the PLC 30 skips the next odorant pulse 86 by resetting the flow pulse counter when the gas odorization system 10 reaches the target flow count without opening the low-flow control valve 22 or the high-flow control valve 23 for the pre-calculated dwell time.

If the result of step 84 indicates that the liquid odorant 72 has cooled by a sufficient amount, additional gas needs to be supplied to the interior of odorant tank 24. The PLC 30 therefore performs an extra pulse immediately 88 by opening either the low-flow control valve 22 or the high-flow control valve 23 (depending on the valve opening duration) for the calculated dwell time without resetting the flow pulse counter. This will cause an extra volume of gas to be injected into the odorant tank 24 to make up for the change in volume of the cooling liquid odorant 72.

As an example of the temperature compensation, assume that a pulse is to be generated for every 100 standard cubic feet of gas that flows through the line. Further assume that 100 cubic inches of saturated gas provides the required level of odorant for 100 standard cubic feet of gas. When the temperature rises enough that the volume of the liquid odorant increases by 100 cubic inches, one pulse will be skipped. When the temperature falls by the same amount, an extra pulse will be added.

As the temperature of the liquid odorant 72 rises and falls, pulses will be occasionally skipped and added respectively. The actual volumetric change that occurs as a result of temperature variations is a function of both the change in temperature and amount of odorant in the tank 24. Changes in volume are a percentage of total liquid volume, so different odorant levels will see different absolute volume changes for a given temperature change.

Any suitable technique can be used to compensate for temperature changes. A simplifying assumption can be made regarding volume, so that pulses are generated or skipped regardless of the actual volume of liquid odorant currently in the tank. If desired, the output from the level sensor 36 can be incorporated into the calculation, so that actual volumetric changes are used to determine when to add or subtract pulses. It is also possible to vary the dwell time of the low-flow control valve 22 and/or the high-flow control valve 23, or adjust the timing between pulses, to compensate for temperature changes. Whether changing the number of pulses, the dwell time of the low-flow control valve 22 or the high-flow control valve 23, or the timing between pulses, compensating for temperature changes in the liquid odorant 72 is desired to provide proper odorization levels.

Figure 5:
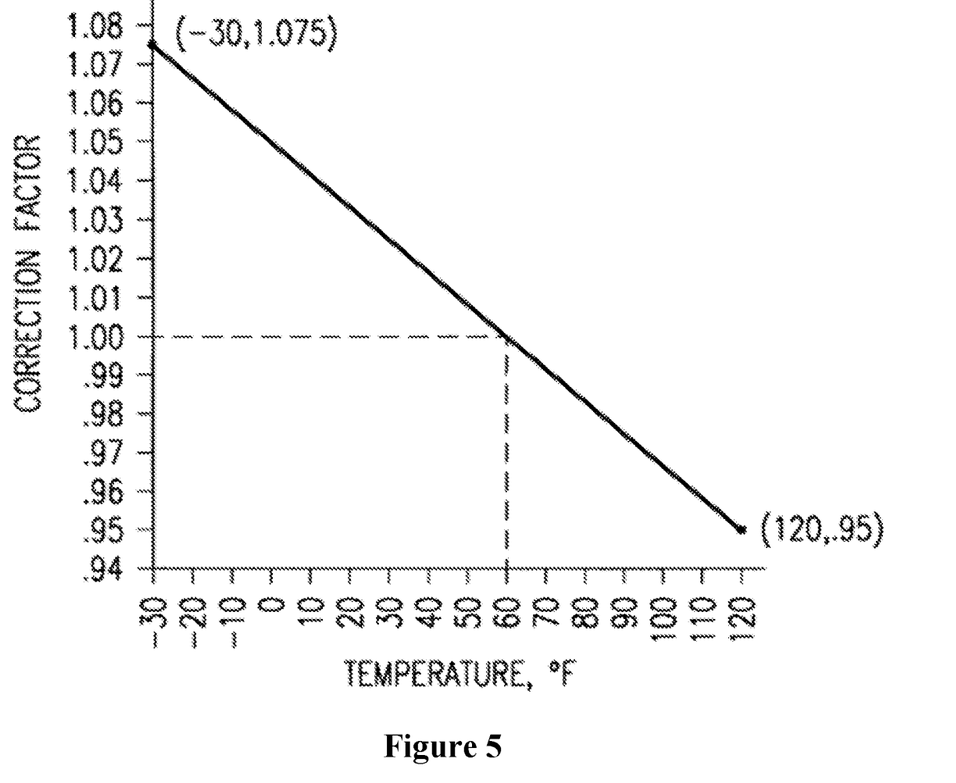
FIG. 5 is a graph illustrating odorant changes in volume as a function of temperature changes.

FIG. 5 is a graph illustrating how the liquid odorant volume varies with temperature. This particular graph is for odorant BP CAPTAN (which contains TBM as the principal odorant) between the temperatures of −30° F. and 120° F. It indicates a correction factor to be applied to obtain the real volume of the liquid odorant in compensation for temperature variations. It is normalized for a temperature of 60° F. This data is widely available, and differs for different materials. The graph shown is for illustrative purposes to show how temperature compensation is performed in an embodiment of the present disclosure.

Because BP CAPTAN liquid odorant expands as its temperature rises, the measured volume of liquid is multiplied by a smaller number to give true volume. For example, at 120° F., the measured volume must be multiplied by 0.95 to arrive at the actual volume that would be measured at 60° F.

As shown by the straight line on the graph of FIG. 5, volumetric changes are essentially linear. Over a temperature range of 150° F., the volume of a given amount of liquid odorant will change by more than 10%. Using the values from this graph, it will be appreciated that the liquid odorant will change in volume by approximately 0.00083% for each degree change in temperature. For a liquid volume of 20 cubic feet, this amounts to approximately 29 cubic inches per degree Fahrenheit. If 100 cubic inches of bypass gas pass through the low-flow control valve 22 or the high-flow control valve 23 during each odorizer pulse, an extra pulse will be needed for approximately every three degrees change in odorant temperature to compensate for the change in volume of the liquid odorant.

As described above, operation of the PLC 30 is simplified by making several calculations ahead of time, and storing into the PLC 30 the resulting data needed to properly operate the odorizer. For example, calculation of bypass gas flow rates through each of the low-flow control valve 22 and the high-flow control valve 23 need only be performed once, unless the valve is changed. Further, the required amount of bypass gas that must be released for each pulse will not change unless the odorant is changed or the desired ratio of odorant to gas is changed. Because these parameters change so rarely as to be considered fixed, this calculation can be performed in advance and the result programmed into the PLC 30.

In order to perform the calculations to determine the dwell time of each of the low-flow control valve 22 and the high-flow control valve 23, several items of information are needed. These include the flow characteristics of each of the low-flow control valve 22 and the high-flow control valve 23, generally provided from the manufacturer for given pressure drops, and how often pulses are needed, in terms of cubic feet per pulse of gas flowing through the main pipeline 14. Also needed is the rate of odorization, in pounds per million cubic feet or other mass per volume ratio. Finally, the solubility of the odorant in natural gas must be known, along with the operating pressures for the system, including pressure corrections such as operating atmospheric pressure. The pre-calculated dwell time for the low-flow control valve 22 may be the same or different than the pre-calculated dwell time for the high-flow control valve 23. In an embodiment, the low-flow control valve 22 has a longer pre-calculated dwell time than the high-flow control valve 23.

Using the solubility factors, pressures, and required pulse rate, known calculations provide the volume of saturated gas that will be needed for each pulse of the odorizer. For example, assuming gas line pressure of 230 psig, BP CAPTAN odorant having a solubility factor of 0.7, and an odorizer pulse every 500 cubic feet of gas flow, approximately 300 cubic inches of saturated gas must be added in each pulse to give an odorization rate of 0.75 pounds per million standard cubic feet. In other words, if the odorizer is pulsed once every 500 cubic feet, each pulse must provide 0.000375 pounds of odorant in the pulse of saturated gas, which is approximately 300 cubic inches under the conditions of the example.

Once the pulse volume is known, the required dwell time per pulse is determined from the flow rate of each of the low-flow control valve 22 and the high-flow control valve 23. For this example, if the low-flow control valve 22 allows 400 cubic inches per second to flow under operating conditions, the dwell time of the low-flow control valve 22 is 0.75 seconds. Under operating conditions, a 0.75 second pulse allows enough saturated gas to flow into the line to properly odorize 500 cubic feet of gas. Other conditions and requirements and conditions will, of course, give different results.

Once these calculations are made, the volume for which a pulse will be made, and the dwell time for each pulse are loaded in to the PLC 30. If conditions change, the PLC 30 can be reprogrammed by running the calculation again and loading the new control data into the PLC 30. This can be performed remotely, by a portable computer connected directly to the PLC 30 on site, or by entering the new data directly at the PLC keypad.

It will be appreciated by those skilled in the art that the described system provides for improved operation. The system is reliable because there are no injection pumps to fail. The system is flexible because changes in operating conditions can be accommodated by changing the frequency of pulsing the bypass system, changing the dwell time of the low-flow control valve 22 and/or the high-flow control valve 23, and allowing for either the low-flow control valve 22 or the high-flow control valve 23 (or both) to be opened. Because of its operational simplicity, the PLC 30 can be programmed in a more complex manner to take into account variables such as temperature changes in the liquid odorant 72 and valve opening duration.

The described system allows for remote control and monitoring of the gas odorization system 10. As previously described, in addition to on-site control through the keypad or by a direct link with a laptop computer, the PLC 30 may be reprogrammed by a remote computer through the communications link. In addition, operational data stored within the PLC 30 may be read remotely by the computer. This allows for central monitoring and control of a large number of odorizers located in widely separated locations. Normal operating data as well as alarm data can be gathered remotely, so that actual operator presence at the odorizer site can be minimized.

Further, the PLC 30 need not even be located at the site where odorant is injected into the gas line. Instead, the various valves and sensors can be connected to actuators that are remotely controlled, either over a physical connection such as a direct communications line, or by remote radio control. Such an arrangement could be useful, for example, when it is desired to control a large number of odorizers from a central location. Instead of using separate PLCs at each location, a larger, central computer can be programmed to monitor all of the odorizers simultaneously and control each of them in the same manner as described above. Including communications in the odorizer system allows for simpler central control and programming.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A system for odorizing natural gas flowing through a distribution pipeline, comprising:
    a bypass line adjacent to a distribution pipeline;
    an odorant tank connected to the bypass line, wherein bypass gas flows through the bypass line, through the odorant tank, and into the distribution pipeline;
    a high-flow control valve and a low-flow control valve in the bypass line, wherein bypass gas flows through the odorant tank and into the distribution pipeline only when (i) the high-flow control valve is open, (ii) the low-flow control valve is open, or (iii) both the high-flow control valve and the low-flow control valve are open;
    a flow meter on the distribution pipeline that monitors gas flow through the distribution pipeline; and
    a programmable logic controller connected to the flow meter, the high-flow control valve and the low-flow control valve;
    wherein the programmable logic controller opens (a) the high-flow control valve, (b) the low-flow control valve, or (c) both the high-flow control valve and the low-flow control valve, for a predetermined dwell time that is proportional to an amount of bypass gas needed to odorize gas in the distribution pipeline each time that a preselected quantity of gas flows through the distribution pipeline.

2. The system of claim 1, wherein the programmable logic controller opens the high-flow control valve when a valve opening duration is greater than or equal to a target opening duration.

3. The system of claim 1, wherein the programmable logic controller opens the low-flow control valve when a valve opening duration is less than a target opening duration.

4. The system of claim 1, wherein the programmable logic controller opens the low-flow control valve and the high-flow control valve when a valve opening duration is greater than a target opening duration.

5. The system of claim 1, wherein the high-flow control valve and the low-flow control valve are located upstream of the odorant tank.

6. The system of claim 1 further comprising a temperature sensor in the odorant tank, the temperature sensor connected to the programmable logic controller,
    wherein the temperature sensor senses the temperature of liquid odorant in the tank and provides a signal to the programmable logic controller proportional to the temperature of liquid odorant in the tank; and
    the programmable logic controller compensates for changes in odorant temperature by modifying the dwell time of the high-flow control valve and the low-flow control valve.

7. The system of claim 1 further comprising:
    a flow sensor in the bypass line, wherein the flow sensor detects flow of gas through the bypass line; and
    a master shutdown valve in the bypass line, the master shutdown valve connected to the programmable logic controller,
    wherein the programmable logic controller closes the master shutdown valve if the flow sensor fails to detect gas flow through the bypass line when either the high-flow control valve or the low-flow control valve is opened.

8. The system of claim 1 further comprising a third control valve in the bypass line, wherein the third control valve has a flow rate that is different than a flow rate of the low-flow control valve, and is different than a flow rate of the high-flow control valve, and
    wherein the programmable logic controller opens (a) the high-flow control valve, (b) the low-flow control valve, (c) both the high-flow control valve and the low-flow control valve, (d) the third control valve, or (e) the high-flow control valve, the low-flow control valve and the third control valve, for a predetermined dwell time that is proportional to an amount of bypass gas needed to odorize gas in the distribution pipeline each time that a preselected quantity of gas flows through the distribution pipeline.

* * * * *